United States Patent [19]

Wiley

[11] 3,968,196

[45] July 6, 1976

[54] METHOD OF CO-EXTRUSION OF POLYVINYLIDENE FLUORIDE/POLYSTYRENE MULTIPLE-LAYERED SHEETING

[75] Inventor: Donald F. Wiley, Big Spring, Tex.

[73] Assignee: Cosden Oil & Chemical Company, Big Spring, Tex.

[22] Filed: Mar. 29, 1971

[21] Appl. No.: 128,939

[52] U.S. Cl. .......................... 264/171; 264/177 R; 264/DIG. 57
[51] Int. Cl.² ...................... B29D 7/02; B29D 9/00; B29F 3/08
[58] Field of Search ............... 264/171, 177 R, 174, 264/245, DIG. 57; 425/461, 462, 131

[56] References Cited
UNITED STATES PATENTS

| | | | |
|---|---|---|---|
| 2,945,265 | 7/1960 | Sell et al. | 264/246 |
| 3,097,058 | 7/1963 | Branscum et al. | 264/245 X |
| 3,415,920 | 12/1968 | Lee et al. | 264/171 |
| 3,423,498 | 1/1969 | Lefevre | 264/171 |
| 3,476,627 | 11/1969 | Squires | 264/171 X |
| 3,491,178 | 1/1970 | Nishioka et al. | 264/171 X |
| 3,565,737 | 2/1971 | Lefevre et al. | 264/171 X |
| 3,576,707 | 4/1971 | Schrenk et al. | 264/171 X |
| 3,659,989 | 5/1972 | Uraya et al. | 425/131 |
| 3,660,993 | 5/1972 | Matsui et al. | 264/171 X |
| 3,671,379 | 6/1972 | Evans et al. | 264/171 X |

Primary Examiner—Willard E. Hoag

[57] ABSTRACT

A process is disclosed for producing composite sheeting of polystyrene having a thin protective layer of vinylidene fluoride polymer. The process comprises joining a molten stream of each polymeric material in a single extruder discharge conduit such that there is produced a single molten stream having a reasonably well defined interface between the two types of polymeric material, and thereafter, passing the resulting single stream of material through a sheet-form extrusion die having its die lips generally aligned with the foregoing interface.

7 Claims, 4 Drawing Figures

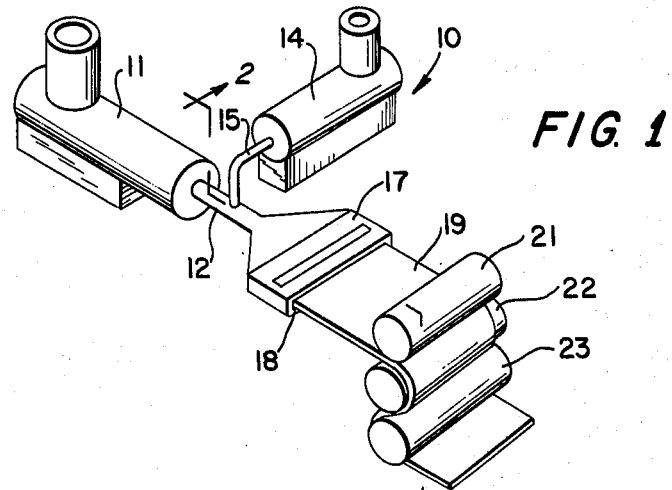
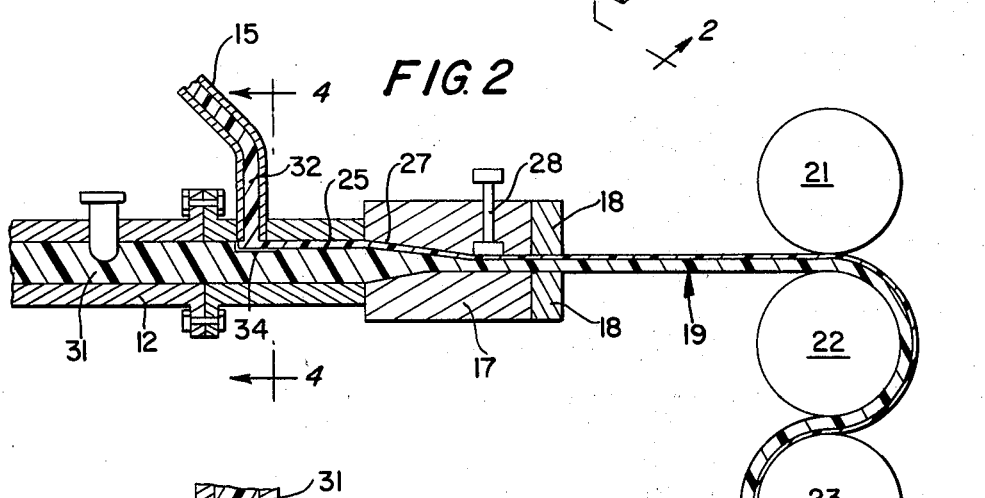
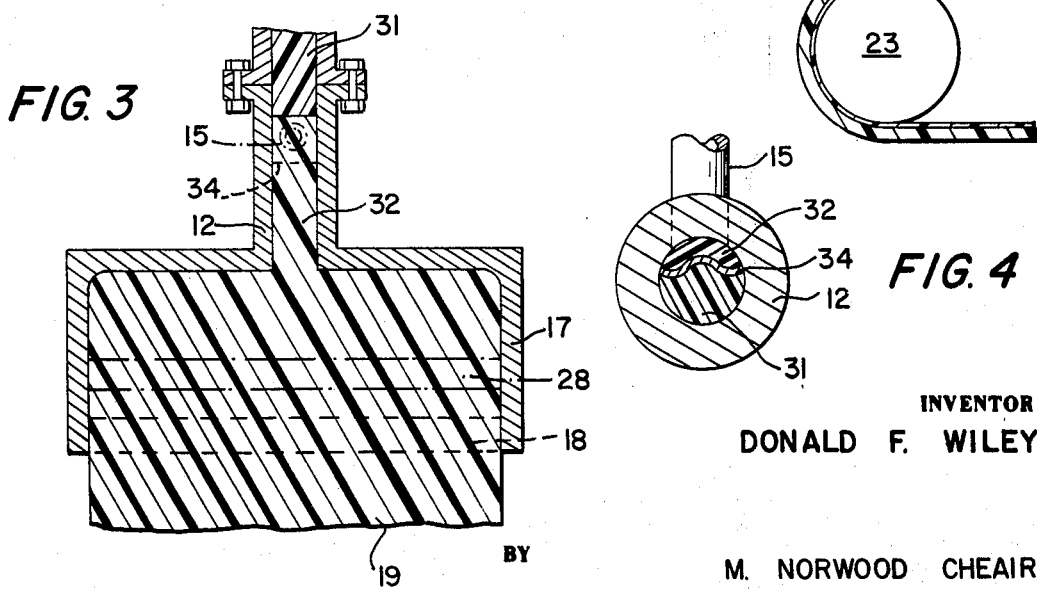
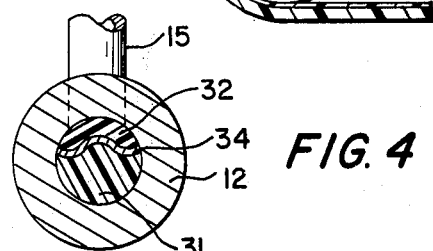
INVENTOR
DONALD F. WILEY
BY M. NORWOOD CHEAIRS
ATTORNEYS

3,968,196

METHOD OF CO-EXTRUSION OF POLYVINYLIDENE FLUORIDE/POLYSTYRENE MULTIPLE-LAYERED SHEETING

CROSS REFERENCE TO RELATED APPLICATIONS

Donald F. Wiley copending applications Ser. No. 128,724 filed Mar. 29, 1971, now abandoned and Ser. No. 128,940, filed Mar. 29, 1971, also now abandoned, are related applications.

BACKGROUND OF THE INVENTION

This invention relates to the production of multiplelayer sheeting, and more especially, to the extrusion of polystyrene sheeting having a thin protective layer of vinylidene fluoride polymer.

Co-extrusion processes for the production of multilayer sheeting are of course well known in the art; however, hitherto known processes almost exclusively employ some form of encapsulation technique wherein one stream of thermoplastic material, typically the volumetrically smaller stream, is completely surrounded, e.g., coaxially, by a second stream of such material prior to passing the entire composite stream through an extrusion die. Alternatively, the foregoing encapsulation may be effected in the cavity-portion of an extrusion die. In both types of process, the resultant sheeting product is characterized by an inner-layer of one type of thermoplastic material sandwiched between or encapsulated by two exterior layers of a second thermoplastic material.

Very little success, with one possible exception, has been recorded in the area of co-extrusion of multiple thermoplastic resinous layers merely laminated on top of one another. Most attempts have employed a series of extrusion dies whereby two distinct sheets of different material are first formed by extrusion, superimposed upon one another and then passed through yet another extrustion die or other restrictive orifice. In other attempts, there are employed complex extrusion dies wherein individual molten streams of thermoplastic material are superimposed upon one another in the die cavity immediately before passing through the die lips.

The possible exception referred to hereinabove relates to U.S. Pat. No. 3,476,627 which discloses a process comprising combining two streams of molten thermoplastic resin in a conduit upstream of an extrusion die such that they have a sharply defined juncture plane, and thereafter passing the composite stream through an extrusion die in such a manner that the juncture plane is parallel to the principle direction of flow of the resin as it takes on the shape of sheeting. The foregoing disclosure is concerned primarily with the co-extrusion of multiple-layered polyvinyl butyral resin. This patent does, however, refer broadly to a process for co-extruding multiple-layered sheeting of different thermoplastic resins having similar processing characteristics and which will adhere to one another, and further limited by the requirement that the volume of a given resin component be at least 25% of the total resin content.

In contrast, this invention is concerned with the production of multiple layered sheeting of two materials which have different processing characteristics, which are highly incompatible and which have hitherto defied attempts both through co-extrusion techniques and conventional laminating methods to produce a strongly adhering bond therebetween. Prior attempts aimed at co-extrusion of such materials have resulted in multi-layered products wherein the individual layers are rather easily peeled from one another, and like attempts to laminate materials of this nature by extruding a molten layer of one polymer onto a preformed sheet of a second polymer have provided similar unsatisfactory results. Moreover, the invention relates to multi-layered sheeting consisting primarily of a less expensive material, i.e., polystyrene, and having only a very thin surface layer or veneer of a second, more expensive polymeric material having highly desirable surface characteristics, i.e., a vinylidene fluoride polymer.

SUMMARY OF THE INVENTION

It is therefore a primary object of the invention to provide a process for producing in a single extrusion step multiplelayered sheeting from two or more normally incompatible polymeric materials.

A further object of the invention resides in providing a method for producing multilayer sheeting having a major thickness of a less expensive polymeric material and a relatively thin surface layer of a more expensive polymeric material which exhibits highly desirable surface characteristics.

A specific object of the invention lies in the production of a multiple-layered sheet comprised primarily of polystyrene and having a protective surface layer of a vinylidene fluoride polymer.

Other objects, features and advantages of this invention will become apparent from the description which follows, when considered in view of the accompanying drawings.

Thus, in accomplishing the foregoing objectives, there is provided according to the invention a process for producing composite sheeting of polystyrene having a relatively thin protective layer of a vinylidene fluoride polymer. The process comprises joining a molten stream of polystyrene and a molten stream of polyvinylidene fluoride (PVF) in an extruder discharge conduit to form a single stratified stream of molten material conforming to the cross-section of the conduit and having a relatively sharply defined interface between the polystyrene and PVF, and thereafter passing this stratified stream through a sheet-form extrusion die having its die lips generally aligned with the foregoing interface. Firm adherence between the polystyrene and PVF layers is achieved by providing that the melt viscosity of the PVF be relatively close to that of the polystyrene, and advantageously nearly identical thereto at the junction point of the two polymeric streams. In this process, the relative proportion of vinylidene fluoride polymer is preferably less than about 20% by volume based upon the total polymeric material. Important operating parameters include the temperature at which each polymeric material exits from the extruder and also the temperature of the extrusion die.

BRIEF DESCRIPTION OF THE DRAWINGS

FIG. 1 schematically represents an apparatus for the preparation of a multiple-layered sheet or film employing the method of the invention.

FIG. 2 is a cross-sectional view taken along the line 2 — 2 in FIG. 1.

FIG. 3 is a top view, in section, of the extrusion die and lead-in conduit portion of the apparatus illustrated in FIG. 1.

FIG. 4 is a cross-sectional view taken along the line 4 — 4 in FIG. 2.

DETAILED DESCRIPTION OF THE INVENTION

In accordance with this invention it has been discovered that a multiple-layered sheet or film may be produced from two polymeric materials which have hitherto been found extremely difficult to unite by conventional extrusion techniques or by postextrusion laminating procedures. Specifically, the sheeting or film of the invention consists of a layer of polystyrene having a thickness substantially corresponding to the final composite sheeting thickness desired, and adhered to either one or both sides of the polystyrene layer, a relatively thin exterior layer of a vinylidene fluoride polymer. Thus, there is provided composite sheeting having the desirable economic characteristics of polystyrene and concurrently possessing the highly desirable surface properties of vinylidene fluoride polymers. Such stock material having a protective layer of PVF is characterized by excellent weathering and chemical resistance, as well as high resistant to abrasion.

An important aspect of the invention resides in the discovery that an essentially uniform and relatively thin layer of PVF may be firmly united to the polystyrene sublayer in a single extrusion step. Although similar extrusion processes are known in the art, as evidenced by the above-mentioned U.S. patent, the same relate to extrusion of chemically similar or at least compatible resinous materials, whereas the process of this invention has been successfully applied to chemically and physically dissimilar resins. Specifically, it has been discovered that polystyrene and PVF can be coextruded to produce a multilayered sheet exhibiting strong adhesion between PVF and polystyrene layers if there is chosen a vinylidene fluoride polymer which has a melt viscosity relatively approximate to that of the polystyrene chosen for the substrate, or alternatively a vinylidene fluoride polymer having a melt viscosity which may be adjusted under extrusion conditions, as for example by sufficiently raising the temperature of the polymer, to a value approximately the melt viscosity of the polystyrene. While it is not possible to put precise limits on the degree of similarity required between the respective melt viscosities of the polymeric materials, and although there perhaps will be some degree of unpredictability between particular polymers falling within any broad characterization, in general, satisfactory results are achieved in accordance with the invention if the melt viscosity of the vinylidene fluoride polymer is within the range of about 50 to 150% of that exhibited by the polystyrene. These relative values are only important under actual co-extrusion conditions since in most instances vinylidene fluoride polymers which differ from polystyrene in melt viscosity under standard test conditions by more than the above range can be modified under processing conditions to adjust the melt viscosity into suitable proximity to that of the polystyrene sublayer material. To illustrate the relationship between relative melt viscosity and adherence of PVF and polystyrene layers, the following data are presented for a representative co-extruded sheet:

| Polymers | Melt Viscosity Values Melt Flow Rate By Extrusion Plastometer (A.S.T.M. D-1238-63T) Condition G (Gms./10 minutes) | Brabender Torque (10 min.) Gram-Meters | Adherence |
|---|---|---|---|
| 1. PVF- Kureha Chemical Industry Co., Ltd.- KF Polymer | 12.88 | 300 | |
| Polystyrene- Cosden Oil and Chemical Co. - Impact 825D pellets | 2.0–3.0 | 370 | Good |

The fact that a strongly adhering multiple-layer sheeting can be obtained from PVF and polystyrene in accordance with the foregoing discovery is indeed surprising, since other polymeric materials normally incompatible with polystyrene, such as polyolefins, cannot be co-extruded with polystyrene to yield a satisfactory adhering multilayered product regardless of the proximity achieved between melt viscosities of the two polymers.

In another important aspect, the present extrusion process has been found operable to produce multi-layered sheeting having extremely thin surface layers of PVF, e.g., on the order of 1 mil or less, in comparison to the total sheet thickness, e.g., 10 to 12 mils or thicker. This is achieved by providing relative feed rates of the polystyrene and PVF such that the volume of PVF generally does not exceed about 25%, and preferably is less than about 20% of the total resin feed. Relative feed rates for the PVF of less than about 15% are, typically, preferred even more. This is in direct contradistinction to the prior art which discloses operability only above a minimum resin content for any given resin component of at least 25% by volume.

The principles of the invention are generally applicable to the manufacture of either multilayer polymeric "film" (less than 10 mils in thickness) or "sheeting" (10 mils or thicker); however, polystyrene based film has not found widespread popularity because of the difficulties encountered in adapting this material to blown film apparatus conventionally employed together with extrusion equipment in the manufacture of film products. Thus, broadly speaking, it is possible to produce a composite film having a 1 mil or thinner surface layer of PVF on a 4 or 5 mil, or even a 1 mil base layer of polystyrene. But practically speaking, the products of most interest are multilayer sheets of from 10 mils up to ⅜ inch in thickness having PVF surface layers measuring from a fraction, e.g., ¼ or ½ mil, to several mils. Accordingly, it will be appreciated that relative volumetric feed rates for the vinylidene fluoride polymer component are frequently very small when thicker sheeting is desired, e.g., less than 1%, and likewise that rates in excess of 20 or 25% are also contemplated when very thin film is produced.

Referring now to the drawings, in FIG. 1 there is schematically illustrated an apparatus, generally designated by the reference numeral 10, particularly adapted for the process of the invention. The apparatus 10 comprises in cooperative combination a first extruder 11 for the extrusion of molten polystyrene, and connected thereto, a discharge conduit 12. A second extruder 14 having a discharge conduit 15 is adapted to provide a minor stream of molten PVF. Conduit 15 terminates at conduit 12 at a point upstream of the sheeting die 17 which is in operative communication with conduit 12 and receives the flow therefrom. Sheet 19 is formed at the die lips 18 and thereafter carried from the die by means of polished cooling rollers 21, 22 and 23.

In FIG. 2 there is illustrated a sectional view of the discharge conduits 12 and 15, extrusion die 17 and cooling roller arrangement 21, 22 and 23. This view illustrates the intersection of conduits 12 and 15, and the configuration of the polystyrene resin 31 and PVF resin 32 as they are combined in conduit 12 to form a stratified stream having an interfacial juncture plane 25. Stratification at the intersection point of the two resins is aided by metal plate 34 positioned in conduit 12 adjacent the entry point of co-extruder discharge conduit 15. Similarly, there is illustrated the passage of the stratified resin stream into the die manifold 27, past restricter bar 28 and ultimately through the extruder die lips 18 to the chrome or cooling roller assembly. Throughout this entire traversal of the extrusion equipment, it is noted that the individual layers of resinous material maintain their stratified relationship, despite the minute proportion of PVF, to form a final product having an essentially uniform surface layer of this material.

In FIG. 3 is illustrated a top view of the conduit 12 and extrusion die 17 to demonstrate the lateral flow pattern of molten polymeric material as it passes into and through the extrusion die. FIG. 4 illustrates more clearly the preferred configuration of plate 34 positioned in conduit 12.

To produce a multi-layered sheet or film having a satisfactory degree of adherence between layers, it is necessary to observe certain process limitations during the extrusion procedure. While it is of course desirable to provide relatively steady flow of polystyrene and vinylidene fluoride polymer through the apparatus and to avoid any turbulence therein, these limitations are rather typical in most extrusion processes employing highly viscous synthetic resins. More important limitations (although not wholly unrelated to the foregoing) reside in the extrusion temperatures for the polystyrene and PVF, and the temperature maintained in the extrusion die. The extrusion of the polystyrene from extruder 11 into conduit 12 should be carried out at a temperature of from about 400°F. to about 500°F., and likewise, it has been found that a similar temperature range should prevail in connection with extrusion of the vinylidene fluoride polymer. The role of the extrusion temperature range for the PVF will be appreciated in view of the foregoing comments relative to the desired melt viscosity of the PVF at the time of co-extrusion. Hence, this range is not intended to be an absolute limitation on the invention, but rather indicates only the median range wherein the melt viscosity of vinylidene fluoride resins may be rendered proximate to the melt viscosity of polystyrene so as to provide strong adherence between layers in the extruded sheet. It is to be understood that the invention would likewise embody within its scope the use of PVF resins which might be extruded at even higher temperatures to produce satisfactory adherence to the polystyrene substrate co-extrudate.

As indicated, die temperature is also an important process variable, but not from the standpoint of layer adherence to one another. Instead, this parameter affects the surface characteristics, e.g., gloss, etc., of the extruded sheet. Die temperature should be maintained relatively constant during extrusion, with typical values thereof for co-extrusion of PVF and polystyrene ranging between about 425° and 525°F. The best surface gloss is attained with temperatures above about 450°F.

In the co-extrusion of polystyrene and PVF the conditions maintained at the cooling roller assembly also affect the surface properties of the final product. The manufacture of smooth sheeting of course requires the use of standard highly polished chrome rollers, typically three in number, each being approximately 12 inches in diameter and being adapted for internal circulation of cooling water. When PVF is co-extruded as a surface layer, however, it has been found that slightly higher than normal roll temperatures, e.g., 160° – 170°F. for the top roll, 170° – 180°F. for the middle roll and 140° – 160°F. for the bottom roll, as well as a lower than normal top roll pressure, e.g., approximately enough to overcome upward spring tension on the rollers, are required to achieve optimum surface characteristics, especially gloss.

Other processing variables of lesser importance include the pressures at which, the polystyrene and PVF are separately extruded before combination. These pressures are of little significance and typically fall within the range of 750 and 3000 p.s.i. for the polystyrene stream and similarly between about 500 and 3000 p.s.i. for the PVF stream. Of course, the downstream pressure at the point where the streams intersect is equal in both streams.

The term polystyrene as employed herein includes both homopolymers of styrene and copolymers of styrene with other polymerizable and polymerized monomers. Included within the latter category are impact polystyrenes which comprise graft copolymers of styrene upon conjugated diene backbone polymers such as polybutadiene, butadiene-styrene copolymers, butadiene acrylonitrile copolymers, natural rubber, etc. Likewise included in this category are normal copolymers of styrene with other well known, conventional monomers.

Similarly, the terms PVF and vinylidene fluoride polymers are to be interpreted broadly to include vinylidene fluoride homopolymers as well as copolymers of vinylidene fluoride with minor amounts of other compatible, copolymerizable vinyl monomers. A multitude of PVF products are available commercially. Suitable vinylidene fluoride resins for use in the process of the invention may easily be ascertained by one of ordinary skill in the art from molecular weight, melt index, and/or melt viscosity data characterizing any given resin.

It will be appreciated that multilayer sheeting having a surface layer of PVF on both sides of the polystyrene layer may be formed according to the principles of the invention. Such an embodiment merely requires that various minor modifications be made in the physical equipment employed to carry out the process. Likewise, it will be appreciated that various types of extrusion dies may be substituted for the one presently illustrated, e.g., end-fed die.

The following specific example is provided to facilitate a better understanding of the invention, it being understood that the same is intended to be merely illustrative and in no wise limitative.

EXAMPLE

A main resin stream of impact polystyrene (Cosden Oil & Chemical Co. 825D pellets) is extruded from a 4½ inch diameter two stage vented extruder containing a 4:1 compression ratio screw. A 1¼ inch diameter 24:1 single stage side extruder also having a 4:1 compression ratio screw is arranged as illustrated in FIGS. 1 and 2 and supplies a second stream of polyvinylidene fluoride resin (KF Polymer — 1100 Pellet — Kureha Chemical Industry Co., Ltd. — high molecular weight — high crystallinity — Brabender Torque = 300 meter-grams (10 min.)). The polystyrene is extruded at a temperature of 440°F. and a feed rate of approximately 680 lbs./hr. The PVF side stream is discharged from the 1¼ inch extruder at 450°F. and at a feed rate of approximately 8 lbs./hr.

The two resinous streams are then combined in the discharge conduit of the 4½ diameter extruder utilizing a baffle plate arrangement illustrated in FIG. 2. There results a single stratified bi-component stream having a horizontal juncture plane between the polystyrene and PVF. The bi-component stream is conducted to a center-fed sheet-form extrusion die which opens to an extrusion slit 40 inches wide with its lips set at approximately 20 mils. The die temperature averages about 520°F.

Upon leaving the die lips, the extruded sheet passes through a series of three 12 inch polished chrome cooling rolls, the top roll maintained at 165°F., middle roll at 175°F. and bottom roll at 150°F. Roll pressures at top and bottom are maintained at 23 p.s.i. and 18 p.s.i., respectively, and at a gap setting of 18 mils. The polishing and subsequent rubber rolls are operated at about 14% excess speed to stretch the extruded sheet to a final thickness of 19 mils.

Examination of the final sheeting product evidences an essentially uniform layer of PVF approximately 0.225 mils thick firmly adhered to the impact polystyrene base layer. This thickness corresponds closely with the relative feed rates for the two resins, i.e., approximately 1.2%.

Thus, there has been provided according to the invention a process for co-extruding multi-layered sheeting of polystyrene and a vinylidene fluoride polymer wherein a PVF layer is firmly adhered to at least one side of the polystyrene base layer. Moreover, the subject process enables the production of multi-layered film or sheeting of polystyrene having very thin, e.g., less than 1 mil, surface layers of PVF.

While the fundamental novel features and advantages of the invention have been pointed out in connection with a single illustrated embodiment thereof, it will be appreciated that various obvious modifications of the co-extrusion process will suggest themselves to one of ordinary skill in the art. Therefore, it is intended to be limited only by the scope of the following claims.

What is claimed is:

1. A process for the manufacture of composite sheeting having a major layer corresponding substantially to the final composite sheeting thickness of a styrene polymer selected from the group consisting of homopolystyrene, impact polystyrene and normal copolymers of styrene containing a minor amount of another copolymerizable monomer, and a minor layer of vinylidene fluoride polymer firmly united to the exterior surface of said major layer, comprising: conveying a heat plasticized stream of said styrene polymer in a conduit having a generally circular cross section, joining to the exterior surface of said styrene polymer stream within the said conduit a second, heat plasticized stream of said vinylidene fluoride polymer, thereby forming a single stratified stream of heat plasticized material conforming to the cross section of said conduit and being characterized by distinct, contiguous layers of said polymeric materials having a relatively sharply defined interface therebetween, said interface terminating at each end at a point on the inside surface of said conduit, adjusting the melt viscosity of the vinylidene fluoride polymer, by adjusting its temperature, to a value within the range of about 50 to 150% of the melt viscosity exhibited by said styrene polymer under extrusion conditions, conveying said stratified stream undisturbed through said conduit to a sheet-form extrusion die having its die lips generally aligned in parallel with the said interface between the two polymeric materials, and passing said stratified stream of heat plasticized material through the said die.

2. The process as defined by claim 1, wherein said styrene polymer is homopolystyrene.

3. The process as defined by claim 1, wherein said interface has a generally arcuate shape with its arc of curvature being concave in the direction of the vinylidene fluoride polymer stream.

4. The process as defined in claim 1, wherein the relative proportion of vinylidene fluoride polymer is less than about 20% based upon the total polymeric material.

5. The process as defined by claim 4, wherein the relative proportion of vinylidene fluoride polymer is less than about 15% based upon the total polymeric material.

6. The process as defined by claim 1, wherein the heat plasticized stream of vinylidene fluoride polymer is extruded at a temperature of from about 400°F. to about 500°F. and the heat plasticized stream of polystyrene is extruded at a temperature of from about 400°F. to about 500°F.

7. The process as defined by claim 6, wherein the extrusion die is maintained at a temperature of from about 425°F. to about 525°F.

* * * * *